United States Patent
Drieux et al.

(10) Patent No.: US 7,149,250 B2
(45) Date of Patent: Dec. 12, 2006

(54) VIDEO ENCODING METHOD

(75) Inventors: Marc Drieux, Saint-Germain-en-Laye (FR); Françoise Groliere, Nogent-sur-Marne (FR); Daniel Snook, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 59 days.

(21) Appl. No.: 10/531,027

(22) PCT Filed: Oct. 13, 2003

(86) PCT No.: PCT/IB03/04522

§ 371 (c)(1),
(2), (4) Date: Apr. 12, 2005

(87) PCT Pub. No.: WO2004/036920

PCT Pub. Date: Apr. 29, 2004

(65) Prior Publication Data

US 2005/0259732 A1 Nov. 24, 2005

(30) Foreign Application Priority Data

Oct. 16, 2002 (EP) .................................. 02292552

(51) Int. Cl.
*H04B 1/66* (2006.01)

(52) U.S. Cl. ............................ 375/240.15; 375/240.12; 375/240.16; 375/240.08; 375/240.14; 382/236; 382/238; 382/240; 382/243; 348/699

(58) Field of Classification Search ............ 375/240.15, 375/240.12, 240.16, 240.08, 240.14; 382/236, 382/238, 240, 243; 348/699
See application file for complete search history.

(56) References Cited

U.S. PATENT DOCUMENTS

| 6,035,070 | A | * | 3/2000 | Moon et al. ................. 382/243 |
| 6,307,886 | B1 | | 10/2001 | Westermann |
| 6,914,937 | B1 | * | 7/2005 | Takenaka ............... 375/240.13 |
| 2002/0037051 | A1 | | 3/2002 | Takenaka |

* cited by examiner

*Primary Examiner*—Shawn S. An
(74) *Attorney, Agent, or Firm*—Larry Liberchuk

(57) ABSTRACT

The present invention relates to an encoding method processing video object planes (VOPs) of I, P or B type and including a dynamic allocation of said VOPs. According to said method, for each input frame a preliminary forward motion estimation is carried out between current and previous frames. Current and previous motion fields are then used to evaluate a coherence factor, expressed as connected to the sums of local differences within current and previous motion field. According to the value of the coherence factor with respect to an empirically determined threshold, a decision is finally taken on the type of the frame to be coded.

2 Claims, 1 Drawing Sheet

VIDEO ENCODING METHOD

FIELD OF THE INVENTION

The present invention generally relates to the field of object-based video coding, and more particularly to a method for encoding a sequence of video data according to a process in which several types of data are identified, said data consisting of so-called Video Object Planes (VOPs) that are either intra coded VOPs (I-VOPs), coded using information only from themselves, or predictive coded VOPs (P-VOPs), coded using a motion compensated prediction from a past reference VOP, or bidirectionally predicted VOPs (B-VOPs), coded using a motion-compensated prediction from past and future reference VOPs.

BACKGROUND OF THE INVENTION

The MPEG-4 visual standard provides technologies to view, access and manipulate objects (rather than pixels, in the case of the previous MPEG standards) in a large range of bit rates, in a lot of application areas such as for instance: digital television, streaming video, mobile multimedia, games, etc. Said standard operates on video objects (VOs) defined by temporal and spatial information in the form of shape, motion and texture information, coded separately in the bitstream (these VOs are the entities that the user can access and manipulate).

The MPEG-4 approach relies on a content-based visual data representation of the successive scenes of a sequence, each scene being a composition of VOs with its intrinsic properties: shape, motion, texture. In addition to the concept of VO, the MPEG-4 standard introduces other ones like the Video Object Layer (each VO can be encoded either in a scalable or non-scalable form, depending on the application, represented by the video object layer, or VOL) and the Video Object Planes (VOPs) (=instances of VOs in time). It is assumed that each frame of an input video sequence is segmented into a number of arbitrarily shaped image regions (the VOs), and that the shape, motion and texture information of the VOPs belonging to the same VO is encoded and transmitted into separate VOLs corresponding to specific temporal or spatial resolutions (which allows later to separately decode each VOP and leads to the required flexible manipulation of the video sequence).

The three types of frames processed by such a coding structure are the following: the I-VOPs, the P-VOPs and the B-VOPs. An I-VOP is an intra coded VOP: the coding operation uses information only from itself (it is the VOP that costs the greatest number of bits). A P-VOP is a predictive coded VOP, and the coding operation then uses a motion compensated prediction from a past reference VOP which can be either an I-VOP or another P-VOP (contrary to an I-VOP, only the difference between the current motion-compensated P-VOP and its reference is coded: thus, a P-VOP usually costs fewer bits than an I-VOP). A B-VOP is a VOP that is coded using a motion-compensated prediction from past and future reference VOPs (I or P-VOPs), based on so-called forward and backward motion estimations respectively. A B-VOP cannot be a reference VOP and, like the P-VOP, only the difference between the current motion compensated B-VOP and its reference VOP is coded.

Unfortunately, using said B-VOP prediction (also called interpolated or bi-directional mode) is not always a gain in term of compression. If the compression can sometimes be improved by a factor of about 20%, it can also in other cases be decreased by a drastic factor.

SUMMARY OF THE INVENTION

It is then an object of the invention to propose an encoding method using this B-VOP prediction only when it is efficient.

To this end, the invention relates to an encoding method such as defined in the introductory part of the description, said encoding method including a coding step of each VOP and, before said coding step, a motion estimation step performed between the current VOP and the previous one, said motion estimation step itself comprising a decision process concerning the type of VOP to be coded and based on the sub-steps of:

carrying out a motion estimation between a VOP number N (VOP N) and the previous one (VOP N-1);

on the basis of said motion estimation, computing a so-called coherence factor, provided for quantifying the sequence motion;

on the basis of a comparison of said coherence factor with a predetermined threshold, taking a final decision on the type of the current VOP, said current VOP being a B-VOP or not according to the value of said coherence factor with respect to said threshold.

BRIEF DESCRIPTION OF DRAWINGS

The present invention will now be described, by way of example, with reference to the accompanying drawings in which.

DETAILED DESCRIPTION OF THE INVENTION

Figure 1:
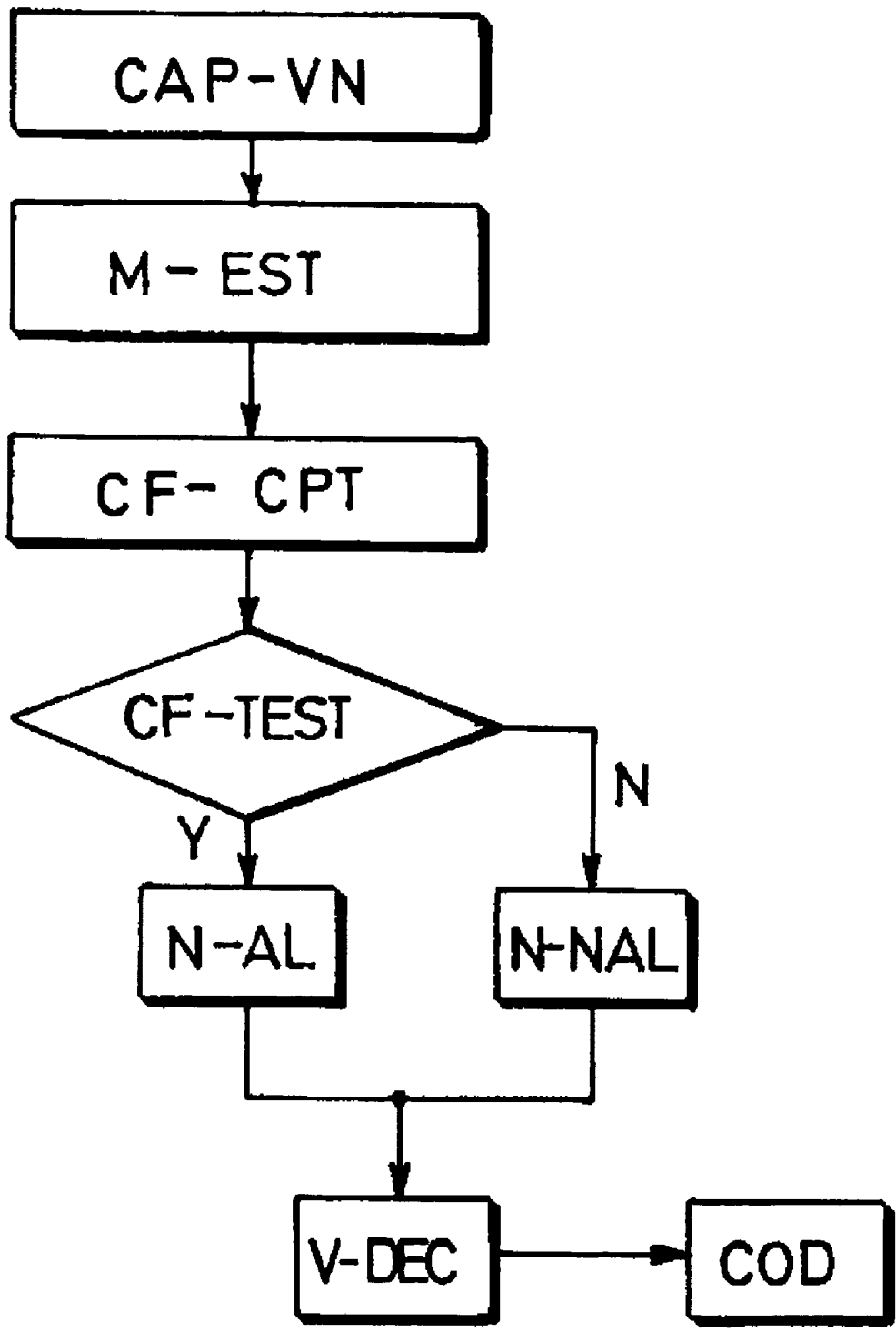
FIG. 1 illustrates the main steps of the encoding method according to the invention.

An MPEG-4 encoder comprises several functional blocks, among which one or several memories, for outputting the VOPs in the transmitting order required by the standard. For example, if the input sequence is I B B P B B P . . . , the output or transmission order will be I P B B P B B . . . (to enable backward prediction, the encoder must re-order the pictures from natural order to said transmission order so that the B-VOPs are transmitted after the past and future VOPs which are their references). Said encoder also comprises a motion estimator, for receiving the current VOP and the previous one (or reference VOP) and taking the decision of which kind of prediction will be implemented for the current VOP: no prediction for an I-VOP, forward prediction for a P-VOP, bi-directional prediction for a B-VOP.

As illustrated in FIG. 1 showing the steps of the decision about the prediction within the motion estimator, the decision is, according to the invention, based on the implementation of the following steps. First, the current VOP (number: N) is captured (step CAP-VN). Then a motion estimation is carried out (step M-EST) between the VOP N and the previous VOP (number: N-1), and a factor named "coherence factor" is computed (step CF-CPT), in order to quantify the sequence motion, and compared (step CF-TEST) to a predetermined threshold. According to the result of the comparison (Y=lower than, or N=not lower than), the VOP N is allowed (N-AL), or not (N-NAL), to be a B-VOP. The final decision concerning the prediction mode is then taken (step V-DEC), and the coding step of the current VOP (=I-VOP, or P-VOP, or B-VOP) can take place (step COD).

Several expressions may be proposed for the coherence factor used in the comparison test, without limiting the scope of the invention. However, a preferred coherence factor may be for instance expressed as the ratio of the sum of absolute differences (SAD) between motion vectors of a macroblock (estimated in 16×16 pixels mode or 8×8 pixels mode) and its predecessor in the same VOP with the similar sum for the previous VOP (it is here recalled that for a macroblock of size k×k, the expression of the SAD is:

$$SAD = \sum_{i=0}^{k \times k} |A(i) - B(i)|$$

where B(i) and A(i) respectively designate the current macroblock considered and the macroblock in the reference VOP which matches the most in a search zone defined in said reference VOP).

The invention claimed is:

1. A method for encoding a sequence of video data according to a process in which several types of data are identified, said data consisting of so-called Video Object Planes (VOPs) that are either intra coded VOPs (I-VOPs), coded using information only from themselves, or predictive coded VOPs (P-VOPs), coded using a motion compensated prediction from a past reference VOP, or bidirectionally predicted VOPs (B-VOPs), coded using a motion-compensated prediction from past and future reference VOPs, said encoding method including a coding step of each VOP and, before said coding step, a motion estimation step performed between the current VOP and the previous one, said motion estimation step itself comprising a decision process concerning the type of VOP to be coded and based on the sub-steps of:

carrying out a motion estimation between a VOP number N (VOP N) and the previous one (VOP N-1);

on the basis of said motion estimation, computing a so-called coherence factor, provided for quantifying the sequence motion;

on the basis of a comparison of said coherence factor with a predetermined threshold, taking a final decision on the type of the current VOP, said current VOP being a B-VOP or not according to the value of said coherence factor with respect to said threshold.

2. An encoding method according to claim 1, in which said coherence factor is expressed as the ratio of the sum of absolute differences (SAD) between motion vectors resulting from said motion estimation, for a macroblock and its predecessor in the same VOP, with the similar sum for the previous VOP.

* * * * *